United States Patent [19]

Caswell

[11] 3,917,385
[45] Nov. 4, 1975

[54] SIMPLIFIED MICROPOSITIONER
[75] Inventor: Robert L. Caswell, Placentia, Calif.
[73] Assignee: Rockwell International Corporation, El Segundo, Calif.
[22] Filed: Sept. 19, 1973
[21] Appl. No.: 398,731

[52] U.S. Cl. ............................. 350/252; 248/485
[51] Int. Cl.² ............................................ G02B 7/02
[58] Field of Search ........... 350/245, 252, 257, 288, 350/310; 331/94.5 D

[56] References Cited
UNITED STATES PATENTS
3,463,019 8/1969 Noe ..................................... 350/252
3,601,476 8/1971 Mackenzie .......................... 350/288
3,764,934 10/1973 Schamberger ................. 331/94.5 D
3,788,733 1/1974 Breglia .............................. 350/287

Primary Examiner—R. V. Rolinec
Assistant Examiner—Michael J. Tokar
Attorney, Agent, or Firm—H. Fredrick Hamann; G. Donald Weber, Jr.; Roland G. Rubalcava

[57] ABSTRACT

A simplified positioning device for effecting and retaining precision alignment of various devices, for example, lenses, focus coils, deflection yokes or the like utilized in high resolution electro-optical type assemblies such as CRT's, TV camera tubes and electron beam assemblies, or optical components or similar components or devices.

9 Claims, 4 Drawing Figures

SIMPLIFIED MICROPOSITIONER

BACKGROUND OF THE INVENTION

1. Field of the Invention

This invention relates to an improved positioning device and, in particular to a positioning device for use in systems requiring a high level of precision in the alignment of electro-optical and similar types of assemblies.

2. Description of Prior Art R. L. G. W.

Reference is made to the co-pending applications bearing U.S. Ser. Nos. 359,590 and 359,591, both entitled Character Generating Method and System by R.L. Caswell and G.W. Evans, respectively. The invention described in the cited applications is one example of a system utilizing a mechanical, adjustable positioner for holding focus coils in high resolution electro-optical type assemblies such as CRT's. This positioner is termed a micropositioner and is useful in maintaining assemblies (such as electronic or optical assemblies) in a precisely defined position. Conventional micropositioners are generally complex assemblies requiring a substantial number of parts with precision tolerances. The known micropositioners are difficult to produce and maintain. Thus, the conventional devices are generally expensive.

Another disadvantage of some conventional micropositioners is the inability of effecting adjustment from the exterior thereof. Rather, known micropositioners must be disassembled (at least partially) in order to effect adjustment thereof. This condition produces substantial expense in maintenance and utilization, and variations in magnetic shielding configuration between adjustment and operation may degrade performance. Also, skilled personnel are required to service and set up the known micropositioners. Moreover, with the difficult, tedious service requirements, existing micropositioners may produce excessive down time periods. Consequently, these micropositioners increase the cost of operation of the associated equipment.

SUMMARY OF THE INVENTION

This invention relates to a low cost positioning device which permits relatively easy, delicate position adjustment of an element supported thereby. The positioner includes an inner ring and an outer ring. The rings are connected by adjustable supports having pivot pins, a fixed stop and a preload member. The inner ring supports the element. The adjustable supports and the fixed stop rotate the inner ring and the supported element about the X and Y axes and translate it in the X direction and Y direction with respect to the outer ring. The preload force exerted by the preload member on all adjustments assures self-locking adjustments without backlash and prevents the element position from shifting by reason of shock or vibration of the positioning device.

DESCRIPTION OF THE PREFERRED EMBODIMENT

Figure 1:
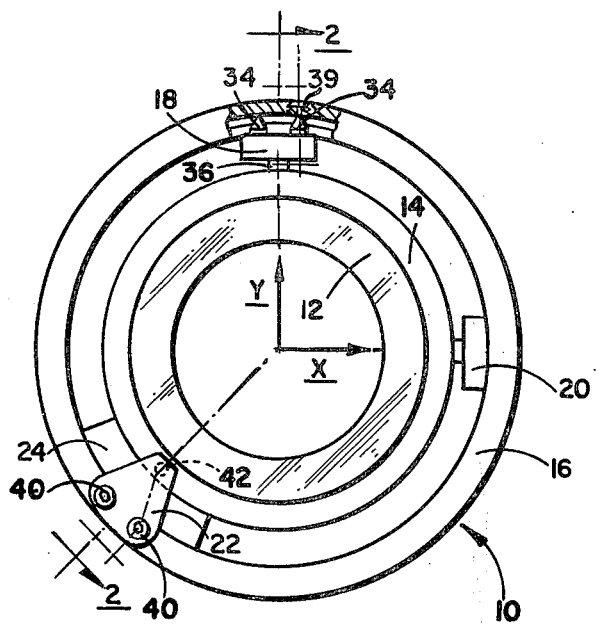
FIG. 1 is an end view, partially in section, of one embodiment of the instant invention.

In the following description, the same reference numeral is used in conjunction with similar components in each of the drawings.

Referring now to FIG. 1, there is shown an end view of one embodiment of positioner 10 which forms the instant invention. Positioner 10 includes a pair of concentric rings or annuli 14 and 16. Inner ring 14 serves as a mount to support the apparatus or device 12 to be positioned. For example device 12 may be an electromagnetic coil which is supported by inner ring 14. The coil may be used with a CRT, an electromagnetic lens or the like. Of course device 12 may be an optical lens or other suitable device. Inner ring 14 is mounted in outer ring 16 by adjustable supports 18, 20 (see subsequent figures for more detail), fixed stop 22, and preload member 24 by which a preload force is exerted against the adjustable supports and fixed stop as described hereinafter. Typically, outer ring 16 is connected to a stationary reference frame 100 (for example by screws 25) with respect to which device 12 is to be aligned as suggested in FIG. 2.

A hollow set screw 39 is threadedly engaged in an aperture in outer ring 16. Set screw 39 engages the point of one pivot point 34. The other pivot point 34 engages notch 32 in channel 30 in outer ring 16. These components and the interaction thereof will be described in greater detail.

Fixed stop 22 is mounted on the side of outer ring 16 by suitable means such as screws 40. Ball bearing 42 (shown in dashed outline) is supported by fixed stop 22 against inner ring 14.

Figure 2:
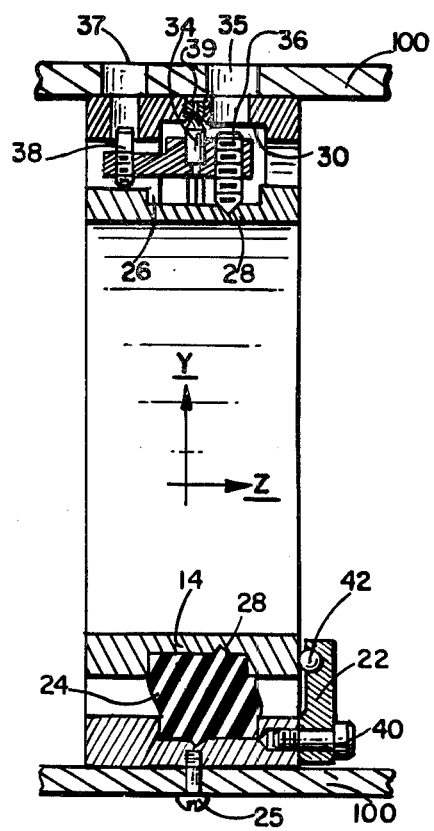
FIG. 2 is a sectional view as taken along the line 2—2 of the embodiment shown in FIG. 1.
Figure 3:
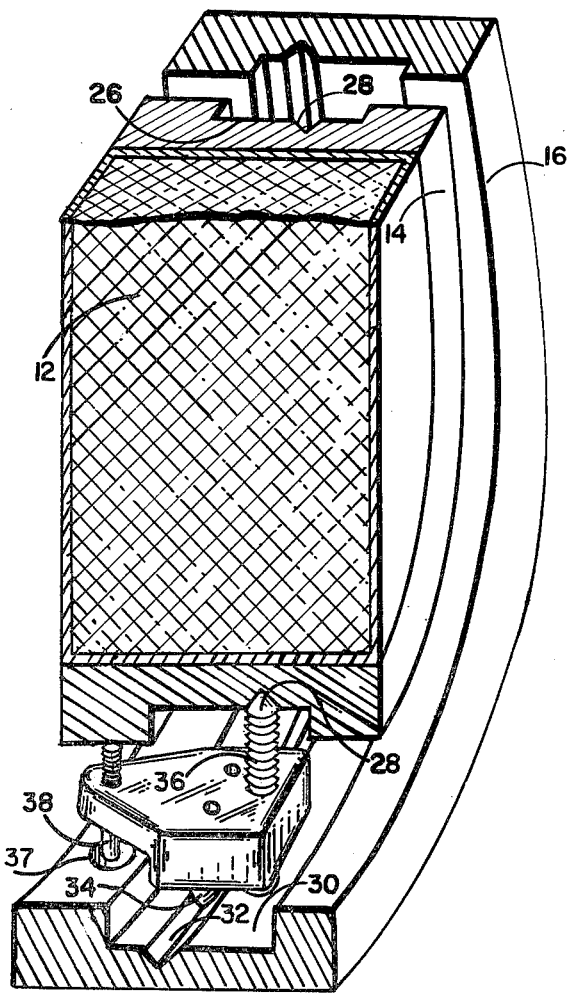
FIG. 3 is a perspective view of one embodiment of the invention.

Referring now to FIGS. 2 and 3, it is seen that inner ring 14 has a first groove or channel 26 inscribed into the outer surface thereof. Channel 26 is a substantially U-shaped channel which is substantially continuous around the peripheral circumference of ring 14. Channel 26 is approximately one third the width of ring 14 and is substantially centered between edges thereof. Channel 26 is of suitable depth to receive the adjustable supports 18, 20 and preload member 24 without weakening the structural strength of ring 14.

A relatively shallow, V-shaped notch 28 is provided at the bottom of channel 26. Notch 28 extends substantially continuously around ring 14 and is adapted to receive portions of the adjustable supports 18 and 20 as described subsequently. In the embodiment described, notch 28 is displaced from the center of the bottom of channel 26.

Outer ring 16 has a similar configuration along its interior surface, namely, a U-shaped channel 30 and a V-shaped notch 32 as depicted in FIG. 3. Channel 30 is disposed slightly off center in outer ring 16 so as to be in offset alignment relative to channel 26. Notches 32 are also displaced laterally. Again, channel 30 is of suitable depth to receive the adjustable supports 18, 20 and preload member 24 without weakening the structural strength of outer ring 16.

Figure 4:
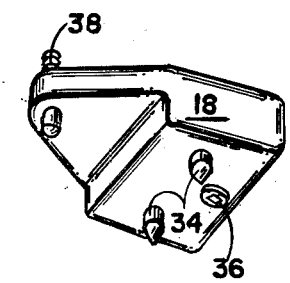
FIG. 4 is a perspective view of an adjustable stop means.

At least two adjustable supports 18 and 20 are required and a fixed stop 22 is also desirable. Each of the support members includes a substantially rectangular section surmounted with a substantially triangular section. While the support members each have one flat continuous surface, the triangular section has a lesser thickness than the rectangular section. Thus, the adjustable support members have a cutaway portion on the other side. The members as best shown in FIGS. 2 through 4, may be machined or molded. Typically, these support members may be fabricated of a suitable metal or plastic material. Adjustable supports 18 and 20 include two substantially fixed pivot pins 34 which extend perpendicularly from the rectangular section (on the cutaway side) of the adjustable support. One pivot pin 34 engages notch 32 of outer ring 16. The other pivot pin rests in the point of a hollow set screw along groove 32 as shown in FIG. 1. Adjustable pivot 36 (a pointed set screw for example), also shown in FIG. 2, extends through adjustable support 18 and engages channel 26 of inner ring 14 with the cone point thereof. The set screw cap may extend beyond support 18, even into an aperture 35 in outer ring 16 whereby set screw 36 can be adjusted through aperture 35 which extends through the outer surface of outer ring 16. The adjustable supports 18 and 20 also include another adjusting set screw 38, the oval point of which rests on the ridge adjacent channel 26 of inner ring 14. The cap of set screw 38 may extend through and into the outer ring 16 whereby it may be adjusted through aperture 37 as shown in FIG. 2. The use of grooves on the outer and inner ring rather than individual sockets for accommodating the pin points reduces requirements for close-tolerance machining or matching of parts. Moreover, minor adjustments of the supports and the stop can be readily effected.

Preload member 24 consists of a resilient substantially rectangular element, for example a rubber block, which is compressed between inner ring 14 and outer ring 16 causing a preload force to be exerted on inner ring 14 and, thus, on adjustable supports 18, 20 and fixed stop 22. In particular, member 24 is inserted into channels 26 and 30. Portions of member 24 extend into notches 28 and 32. The preload force exerted by preload member 24 is such that it has positive components in the X, Y and Z directions as suggested by the arrows in FIGS. 1 and 2. As a result of the preload force all adjustments on the adjustable supports 18, 20 and fixed stop 22 are self-locking, substantially free of backlash, and substantially maintain inner ring 14 position from being shifted by normal shock or vibration. It is clear that this preload principal can be applied in a variety of ways. The preload member need not be a rubber block. For example, it can be a spring or other similar devices. In some cases a gravity arrangement may be devised.

Fixed stop 22, in conjunction with supports 18 and 20, serves to support inner ring 14 relative to outer ring 16 and to regulate the preload force. Fixed stop 22 also serves to resist vibration and minimizes the "creep" in preload member 24. Stop 22 has a triangular configuration with substantially flat surfaces and may be fabricated from a suitable metal or plastic material.

Fixed stop 22 includes apertures through which cap screws 40 are inserted and which screw into threaded holes in outer ring 16. Also, an approximate hole or socket for mounting a press fit ball bearing 42 which presses against the side of inner ring 14 as shown in FIG. 2. Ball bearing 42 provides stop 22 with a single point contact on ring 14 which permits both translation and rotation of ring 14 under control of supports 18 and 20. In some cases fixed stop 22 could be eliminated. This would, however, require that resilient member 24 also serve as a support.

Adjustable supports 18 and 20 each pivot with respect to the outer ring 16 about the two contact points, i.e. fixed pivot points 34. It is possible for the adjustable supports to have only one pivot pin therein. However, in such a case, assembly and mechanical stability of the required components would be more intricate and difficult. In the preferred embodiment, one pivot point is in notch 32 in the outer ring 16 and the other pivot point is disosed in the hole in hollow point set screw 39 in outer ring 16 as shown in FIG. 1. The pivot points, combined with the preload force exerted by preload member 24, constrain the adjustable supports 18, 20 to limited motion consisting of rotation about a line connecting the two respective pivot points. By adjusting either (or both) of the bearing screws, i.e. oval point set screw 38 and the pivot screw 36, the angular position of the adjustable supports and the radial position (with respect to ring 16) of the contact points at the bearing screws can be changed as desired. This permits the inner ring 14 and device 12 mounted therein to be positioned as desired in X and Y translation as well as in rotation about the X axis or Y axis.

In describing the operation of positioner 10, consider that device 12 is a focus coil for a CRT. The micropositioner 10 is held rigidly by the frame assembly 100 of the CRT, at four points on the outer ring 16. The focus coil of the micropositioner 10 is mounted on the neck of a CRT towards the flare of the CRT. Coil 12 is mounted in the central opening of inner ring 14. Coil 12 may be held in ring 14 by means of set screws or other suitable mounting means. All CRT components are aligned with the neck or flare of the CRT. The alignment procedure for focus coil 12 is then carried out. The center of the CRT screen area can be determined with a microscope reticle. In a conventional alignment procedure two spots from the coil to be aligned appear on the CRT screen. Oval point screw 38 of support 20 may be used to substantially establish the vertical position of the spots with respect to each other. Oval point screw 38 of support 18 may be used to substantially position both spots horizontally with respect to each other. Using both of those controls the spots are merged. Pivot set screw 36 of support 20 may be used to substantially move both spots horizontally to the center of the screen. Pivot set screw 36 of support 18 may be used to move the spot vertically to the center of the screen with respect to the microscope reticle. The sequence of adjustments is repeated until the spots are both merged and centered.

It has been shown that a simplified micropositioner of the type described herein can precisely align a focus coil to within 0.001 in translation and 0.0001 radian in angle with substantially no backlash. All the adjustments may be easily made with conventional tools, and the preload force makes all adjustments self-locking preventing the coil position from being shifted by normal shock or vibration for at least the life of the CRT. Another feature of this invention is that the micropositioner can be readily adjusted from the exterior through small openings on the surface of the assembly.

Although the inventive design can accomplish at least four degrees of freedom in accurately positioning with few parts, there are no close tolerance machining operations required. As a result, this invention is not only precise and stable but also economically attractive. The micropositioner in this invention may be utilized in high resolution CRT assemblies using magnetic deflection to precisely position the deflection yoke in much the same manner as the focus coil is positioned with respect to the CRT screen.

The embodiment shown and described is illustrative only. It is not meant to be limitative of the invention. Rather, the scope of the invention is to be defined by the claims appended hereto.

I claim:

1. A positioning device comprising:

an outer ring;

an inner ring for supporting a device to be precisely positioned;

preload means interposed between said inner ring and said outer ring to produce a predetermined force relationship between said rings;

fixed stop means connected to said inner ring and said outer ring;

adjustable support means interposed between said inner ring and said outer ring; and said adjustable support means including at least one pivot and an adjustable bearing means arranged such that the angular position of said adjustable support means can be adjusted about said pivot by adjusting said adjustable bearing means to establish the relative position of said rings.

2. The positioning device recited in claim 1 wherein said inner ring has a channel inscribed in the outer periphery thereof and a groove offset from the center inscribed in said channel, and said outer ring has a channel inscribed in the inner periphery thereof to complement the channel of said inner ring and a groove inscribed in said channel.

3. The positioning device rectied in claim 2 wherein said adjustable support means include at least one fixed pin having a pointed edge engaging said groove of said outer ring, a pivot set screw pin having a conical point which engages the groove of said inner ring, and an adjustable bearing screw having a round edge which engages the surface of said inner ring.

4. The positioning device recited in claim 1 wherein said preload means comprises a resilient member which exerts a preload force on said adjustable support means and said fixed stop means in order to reduce backlash thereon.

5. The positioning device recited in claim 1 wherein said fixed stop means is rigidly connected to the side of said outer ring with suitable connecting means, and against the side of said inner ring to regulate the position of said inner ring as a function of the preload force.

6. The positioning device recited in claim 1 wherein the position of said inner ring can be adjusted to within 0.001 in translation and 0.0001 radian in angle with substantially no backlash.

7. The positioning device recited in claim 2 wherein the grooves in each of said channels are offset in different directions from the center of the respective channels.

8. The positioning device recited in claim 4 wherein said preload means comprises an elongated block of rubber which is compressed between said inner and outer rings.

9. The positioning device recited in claim 2 wherein the channel and groove in each ring extends continuously around the periphery of the respective ring.

* * * * *